United States Patent [19]
Habermann et al.

[11] Patent Number: 4,561,313
[45] Date of Patent: Dec. 31, 1985

[54] DEVICE FOR MEASURING THE LONGITUDINAL TENSION IN A STRIP OF MATERIAL

[75] Inventors: Helmut Habermann, Vernon; Maurice Brunet, Saint-Marcel, both of France

[73] Assignee: Societe Europeenne de Propulsion, Puteaux, France

[21] Appl. No.: 669,089

[22] Filed: Nov. 7, 1984

[30] Foreign Application Priority Data

Nov. 18, 1983 [FR] France .................. 83 18435

[51] Int. Cl.$^4$ ............................................. G01L 5/10
[52] U.S. Cl. .................. 73/862.07; 73/862.45; 72/17
[58] Field of Search ......... 73/862.07, 862.45, 862.61, 73/862.55, 159; 72/17; 308/10

[56] References Cited

U.S. PATENT DOCUMENTS

| | | | |
|---|---|---|---|
| 4,041,779 | 8/1977 | Greb | 73/862.45 |
| 4,245,869 | 1/1981 | Scheffer et al. | 308/10 |
| 4,428,244 | 1/1984 | Takeda | 73/862.07 |

FOREIGN PATENT DOCUMENTS

| | | | |
|---|---|---|---|
| 2358527 | 5/1975 | Fed. Rep. of Germany | 308/10 |
| 2848638 | 5/1980 | Fed. Rep. of Germany | |
| 0007205 | 3/1970 | Japan | 73/862.07 |

*Primary Examiner*—Charles A. Ruehl
*Attorney, Agent, or Firm*—Fitzpatrick, Cella, Harper & Scinto

[57] ABSTRACT

The device for measuring the longitudinal tension in a strip leaving a rolling mill or stand comprises a measuring roll over which the strip bearingly runs, said roll consisting of at least one roll mounted on active radial magnetic bearings acting as load sensors and supplying a signal based upon the tensile stress in the strip bearing on said measuring roll, and means for measuring the current flowing in the windings of the magnetic bearings, as well as means for detecting the radial position of the rolls supported by said bearings and means for measuring the air gap of the magnetic bearings and keeping said air gap substantially constant.

10 Claims, 7 Drawing Figures

DEVICE FOR MEASURING THE LONGITUDINAL TENSION IN A STRIP OF MATERIAL

This invention concerns a device for measuring the longitudinal tension in a strip of material leaving a rolling mill, comprising a measuring roll overrun by the strip and load sensors associated with the measuring roll to supply a signal which is a function of the tensile stress on the strip of material bearing on said measuring roll.

It is particularly important to know the longitudinal tension in a material as it is being stretched, as for example in the case of a metal strip leaving a rolling mill or mill stand. Any differences in strip tension across the strip during rolling can result in strip flatness defects, especially if the strip is wide and thin. Accordingly, it is necessary to measure the distribution of tensile stresses over the width of a strip of material being stretched so as to be able to act on the mill parameters as required to correct too-large tension differentials which might affect the strip's overall flatness and damage the strip.

Prior art tension measuring devices generally make use of a measuring roll arranged transversally across the path of the rolled sheet and consisting of a series of coaxial disks aligned on one shaft to carry the strip. Each disk is mounted on ball bearings or air bearings and is equipped with load cells generally consisting of piezoelectric transducers which supply signals according to the tensile stress in the strip of material bearing upon the corresponding disk.

The known devices have a number of drawbacks due in particular to the fact that the measurements are affected by temperature and by operating conditions, making it difficult to obtain accurate, reliable measurement data.

This invention is directed to overcoming the above-mentioned drawbacks and to providing a device for measuring the longitudinal tension in a strip of material which is both more accurate and ruggeder than the known devices as well as particularly suited for difficult operating conditions, such as for example high ambient temperatures and high travel speeds of the strip.

These objectives are met thanks to a measuring device wherien, in accordance with the invention, the measuring roll consists of at least one roll mounted on active radial magnetic bearings which form said load sensor, means for measuring the current in the windings of the active magnetic bearings, means for detecting the radial position of the rolls supported by said bearings, and means for measuring the air gap in the magnetic bearings and keeping it substantially constant.

The measuring roll preferably consists of a plurality of individual rolls coaxially aligned crosswise to the strip of material, each mounted on active magnetic bearings and each associated with means of measuring the current in the windings of said active magnetic bearings and with means for measuring the air gap of said magnetic bearings and keeping the latter substantially constant.

Each individual roll can be supported by two active magnetic bearings.

A major feature of the invention is that the measuring device comprises, for each active radial bearing, a first series of electromagnetic detectors of the radial position of the corresponding individual roll to control the active radial bearing and keep the said radial position substantially constant, and a second series of electromagnetic radial position sensors, associated with at least one reference coil having a predetermined air gap, to determine the value $E_o$ of the mean air gap of the magnetic bearing.

Another feature of the invention is that a correction is effected, for different values of the mean air gap $E_o$, which correspond to different operating temperatures, based upon a prior calibration involving the determination, for different predetermined loads, of the coefficient of correction a which must be added to the mean air gap to determine the value of the load F according to the equation $$F = K(I^2/(E_o + E_x + a)^2)$$

where I is the current applied to the magnetic bearing, $E_o$ the measured value of the mean air gap, $E_x$ the value of the differential air gap measured by the first series of sensors and kept to a substantially null value, a is the coefficient of correction taking into account magnetic leaks and changes in the permeability $\mu$ of the radial bearing stator as a function of the magnetic induction and the expansion of the rotor and K a meter constant.

Where the measuring roll includes a plurality of individual rolls, the separate individual rolls mounted juxtaposed to one another have their top parts reground after fitting to enable all the individual rolls to be driven together uniformly by the strip.

A permanent magnet repulsion passive axial bearing can be associated with each radial bearing on the corresponding front face of the given individual roll.

Other features and advantages of the invention will become apparent from the following description of specific embodiments given by way of example, with reference to the appended drawings in which.

Figure 1:
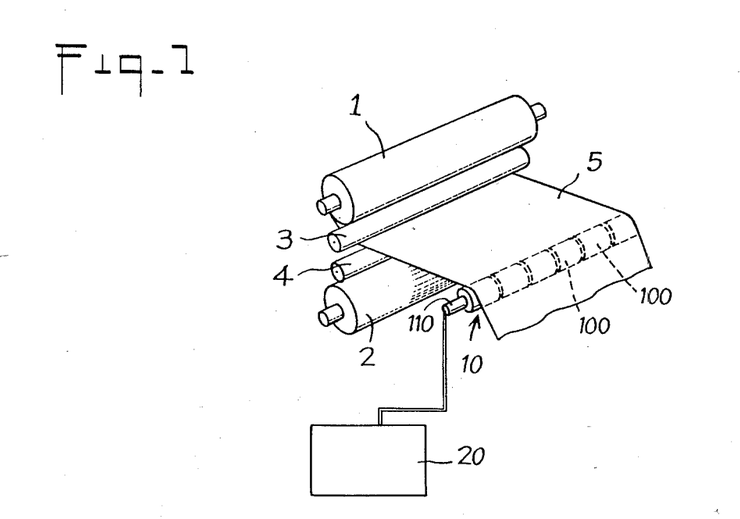
FIG. 1 is a diagram in perspective of an installation in which a measuring device according to the invention can be installed.

FIG. 1 shows a rolling mill exit stand which includes a pair of supporting rolls 1, 2 and a pair of work rolls 3, 4 between which passes a steel strip 5. The flatness of the strip 5 is controlled by continuous measurement of the longitudinal tensile forces on this strip at different points along a transverse line to said strip 5. The longitudinal tensile forces are arranged with the help of a measuring roll 10 arranged parallel to rolls 1 through 4 of the mill stand, downstream from said mill rolls, which measuring roll the strip 5 bearingly overruns.

The measuring roll 10 is made up of a plurality of coaxially juxtaposed individual rolls 100 mounted on a fixed shaft 110 via active radial magnetic bearings 102. The magnetic bearings 102 are associated with individual roll 100 radial position detectors 101 placed in the immediate vicinity of the bearings 102. The signals output by the windings of the radial magnetic bearings and by the position detectors 101 are processed by electronic circuits 20 to supply output data representing the value of the longitudinal tensile stresses on strip 5 at each individual roll 100.

A change in the stress occurring in the metal of strip 5 changes the pressure on each roll 100, and the value of this pressure on the roll is found by measuring the current flowing in the excitation windings of the magnetic bearings 102 supporting each individual roll 100.

Figure 7:
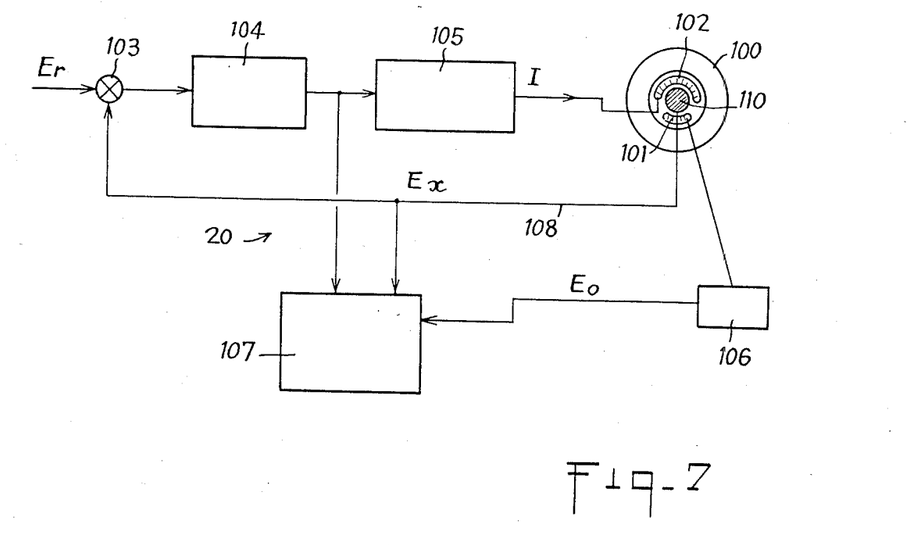
FIG. 7 is a circuit diagram of the electronic circuit of the device according to the invention.

The measuring system formed by a given individual roll 100 will be described in detail with reference to FIGS. 2 and 7.

Figure 2:
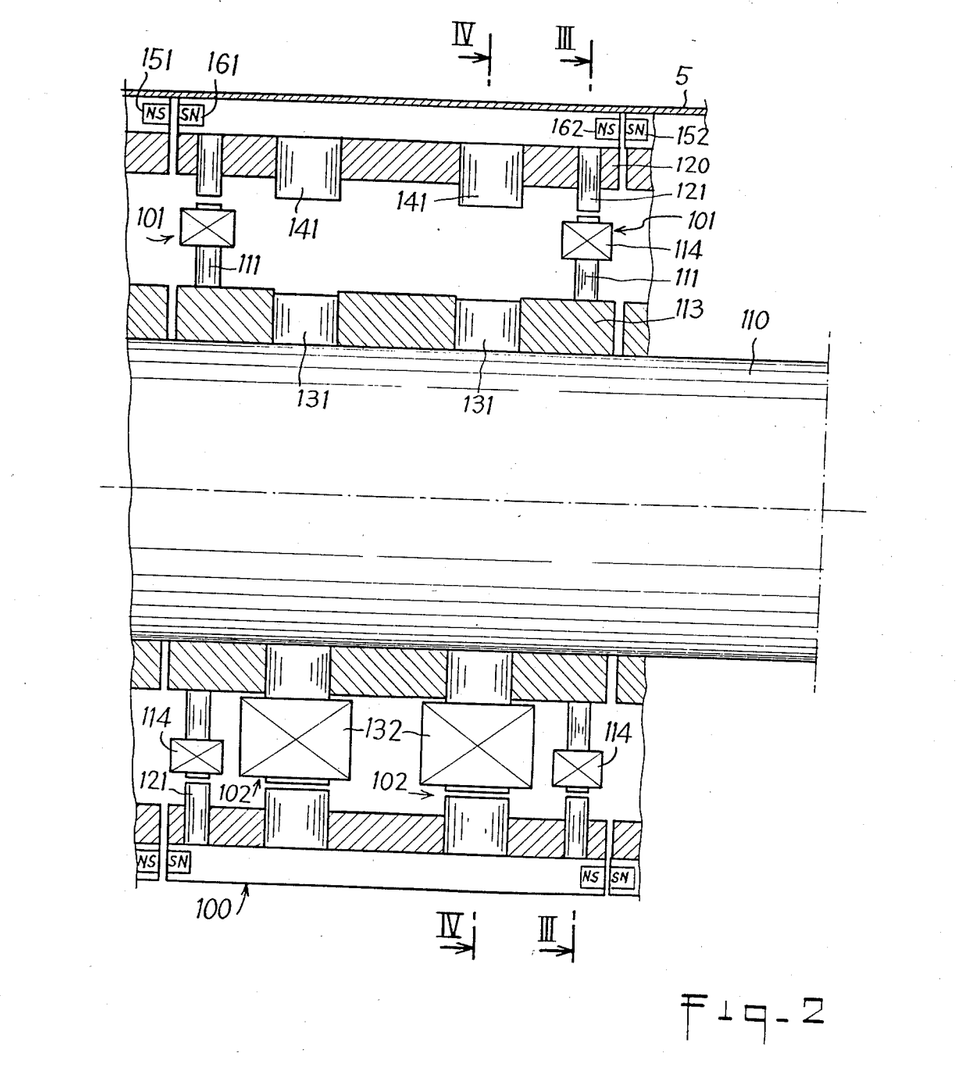
FIG. 2 is an axial cutaway view of an individual measuring roll according to the invention.
Figure 4:
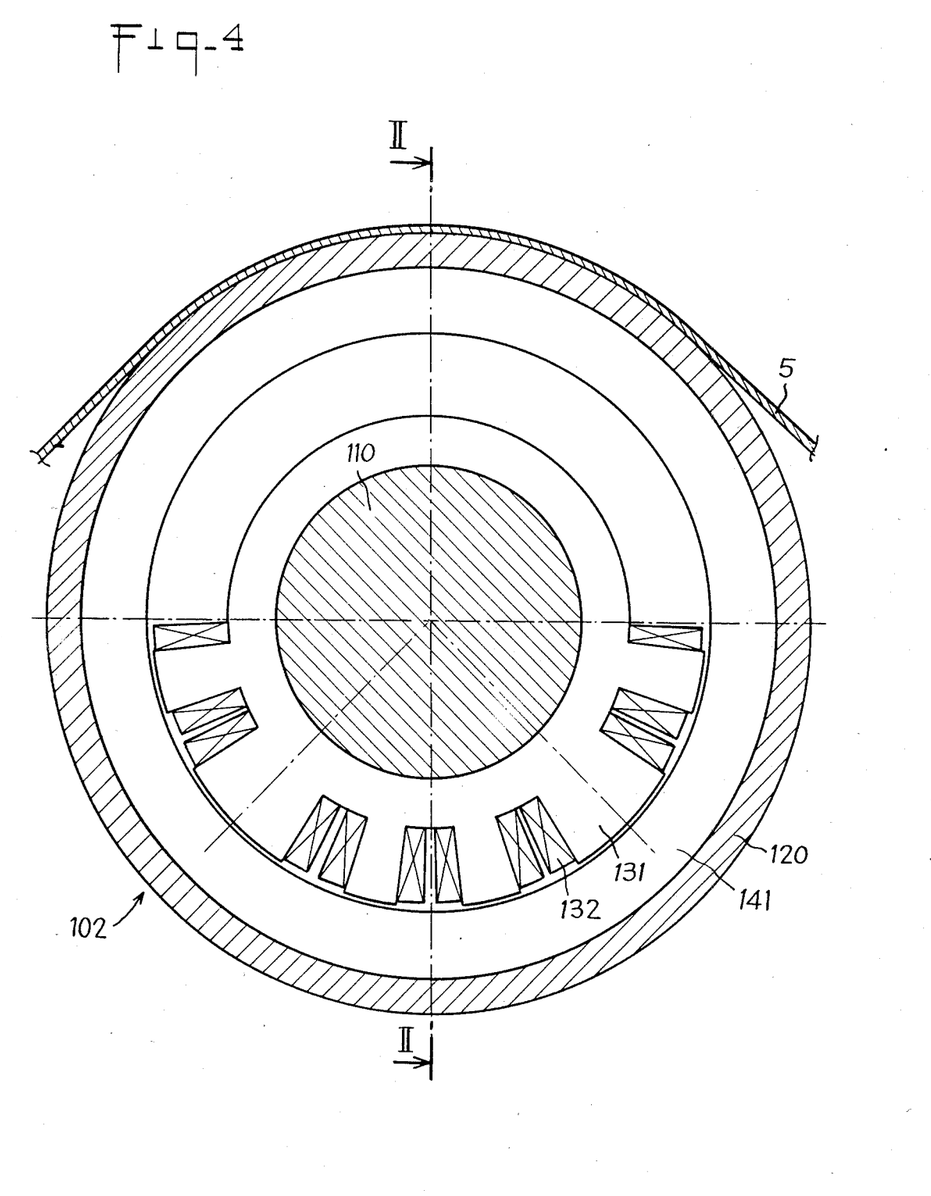
FIG. 4 is a radial cross-sectional view, taken along IV—IV of FIG. 2, of a radial magnetic bearing supporting the roll of FIG. 2.

FIGS. 2 and 4 show a radial magnetic bearing 102, comprising a stator 131, consisting of a stack of metal sheets mounted in a support 113 solidly attached to the center shaft 110 and of windings 132 disposed in slots provided in the stator 131, and a laminated rotor 141 mounted in the rim 120 of the roll 100 supporting the strip of material 5. The basic structure of magnetic bearing 102 is conventional, but the value of the current flowing in the excitation windings 132 of the stator serves to determine the value of the pressure exercised by the strip 5 upon a roll 100 supported by one or two magnetic bearings 102. It is known in fact that the force acting on a magnetic bearing suspension is proportional to the square of the intensity of the current flowing in the excitation windings of a magnetic bearing. Thus, by measuring the intensity I of said current, one can find the value of the pressure of a strip 5 on an individual roll 100 and pursuant, the value of the tensile stress in strip 5 in the area of the given individual roll 100, provided the size of the air gap in the magnetic bearing 102 is itself known.

Figure 3:
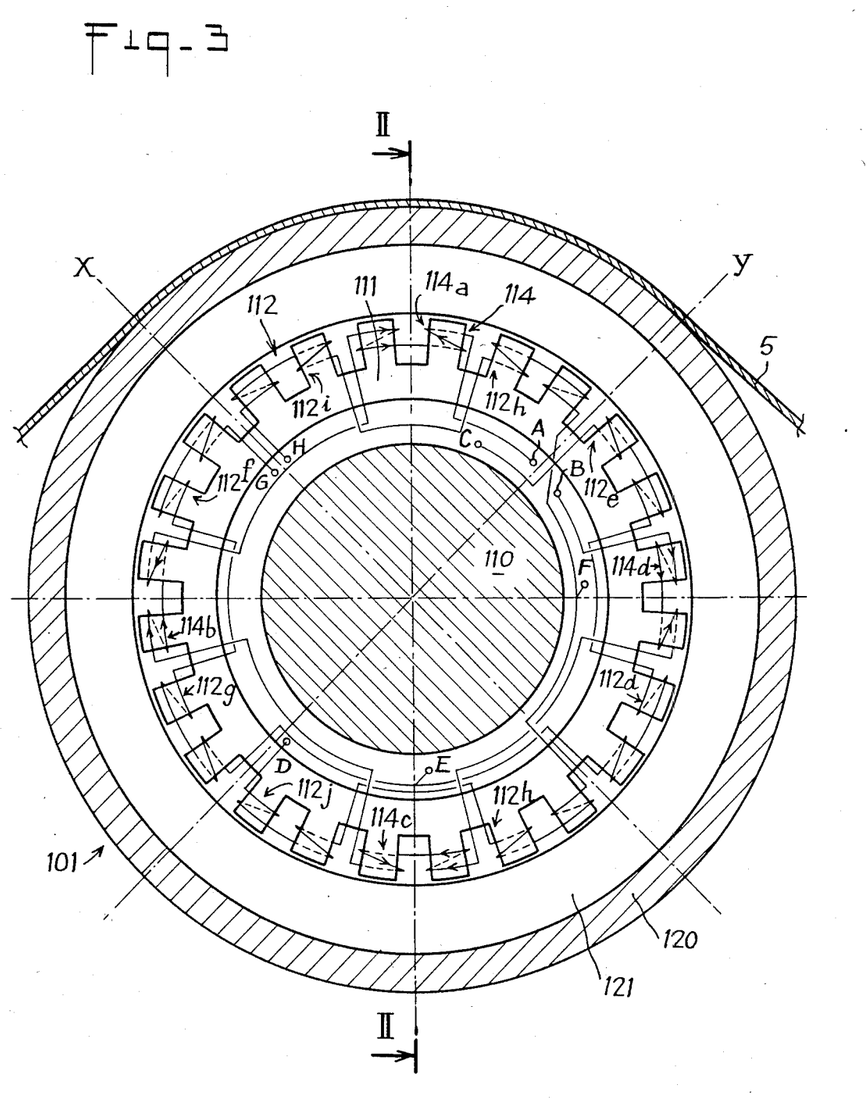
FIG. 3 is a radial cross-sectional view taken along III—III of FIG. 2, of a system for detecting the radial position of the roll in FIG. 2.

A detector 101 of the radial position of the rotor 120 of a roll 100 is provided for each magnetic bearing 102. The detector 101 illustrated in FIGS. 2 and 3 is an electromagnetic type, comprising a laminated-sheet stator 111, fitted to the support 113 solidly attached to the fixed center shaft 110, and having a plurality of slots with windings 112 and 114 arranged therein. The stator 111 cooperates with a rotor 121 which is integral with the rim 120 of the roll 100 and also consists of stacked, laminated annular sheets, the inward end thereof facing the poles of the stator 111, leaving a gap equal to the gap of the magnetic bearing 102 associated therewith, given the nearness of detector 101 to bearing 102.

Said detector or inductive electromagnetic sensor 101 includes a first series of windings 112 which can consist, for example, of a set of windings 112d to 112k arranged as described in French Patent No. 2214890, bridge-connected windings 112 being designed to enable a signal to be generated representative of the changes $E_x$ in the air gap of detector 101 and consequently of magnetic bearing 102. These signals from windings 112, representing gap changes $E_x$, are sent via line 108 (FIG. 7), on the one hand to a computing circuit 107 which computes the value of the tensile stress or force F acting on strip 5 in the area of the given roll 100 and, on the other hand, to a comparator 103 which compares said signal with a reference signal $E_r$. A signal processing circuit 104, which receives the error signal from comparator 103 controls the current applied to the excitation windings 132 of magnetic bearing 102 to keep the rotor 120 of roll 100 in a stable, preset position with the least possible variation in the air gap of magnetic bearing 102. The signal outputted by circuit 104 is amplified by amplifier 105 to feed the windings 132 of bearings 102. The same signal from circuit 104, which is proportional to the current I flowing in windings 132, is also applied to circuit 107 which generates the signal representing the pressure on roll 100.

Figure 5:
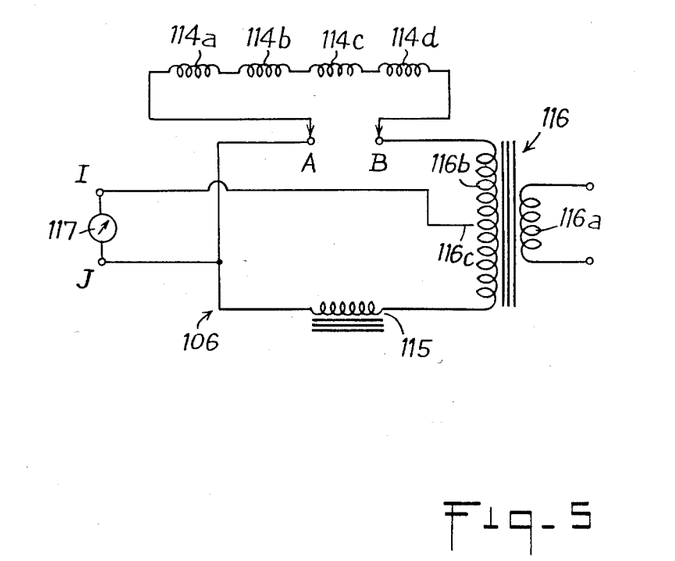
FIGS. 5 and 6 illustrate two variants of a system for measuring the mean gap of the radial magnetic bearing supporting the roll of FIG. 2.
Figure 6:
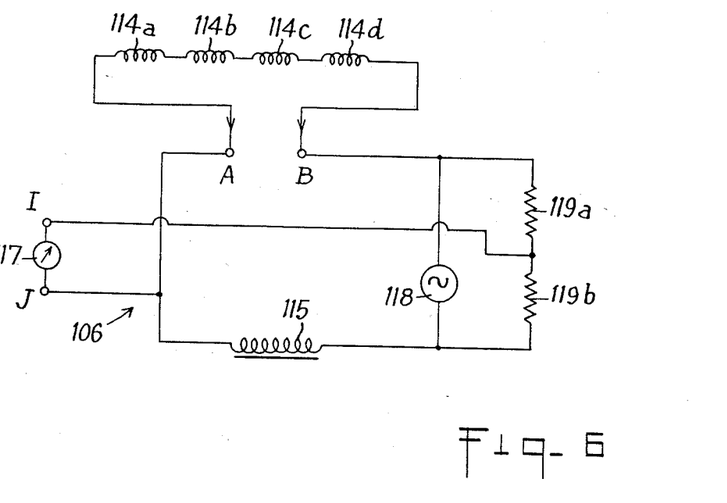

Electromagnetic sensor 101 further comprises a second series of windings 114 consisting for example of four windings 114a, 114b, 114c, and 114d connected in series as shown in FIG. 3 and associated with a reference winding 115 as part of a circuit 106 like that diagrammed in FIG. 5 or FIG. 6, to enable generation of a signal representing the value of the mean air gap $E_o$ of magnetic bearing 102. Said signal $E_o$ supplied by circuit 106 is also applied to computation circuit 107 to generate a signal representing the value F of the pressure exerted by the strip 5 on the given individual roll 100, according to the formula:

$$F = K(I^2/(E_o + E_x + a)^2) \tag{1}$$

where I is the excitation current supplied to the windings 132 of the magnetic bearing 102, $E_x$ stands for the changes in the air gap of the magnetic bearing 102 as measured by the windings 112 of the position sensor 101, $E_o$ is the value of the mean air gap of bearing 102 as measured by windings 114 of position sensor 101, a is a correction coefficient taking into account magnetic leakages and changes in the permeability $\mu$ of the stator 131 as a function of the magnetic induction and the expansion of the rotor 120 supporting lamination 141, and K is a meter constant.

It should be emphasized that the differential air gap $E_x$ is maintained at a value near zero thanks to the control system 103, 104, 105 which modifies the value of current I so as to hold the rotor 120 in a preset position with respect to the stator fixedly secured to the shaft 110. The mean air gap $E_o$ itself can be accurately defined thanks to the comparison carried out in circuit 106 with at least one winding 115 having a preset, fixed air gap and being subjected to the same temperature conditions as windings 114.

It is important to measure the mean air gap $E_o$ because, due to the heat resulting from friction between the strip 5 and the rotor 120 of roll 100, said rotor 120 exhibits significant differential expansion with respect to the stator. This leads to changes in the mean air gap value which must be taken into account in providing an accurate measurement.

The correction coefficient a accounts for the fact that, regardless of the grade of ferromagnetic sheets used to make the armatures of bearing 102 and sensor 101, some core loss will always occur as well as leakage through the gap, said losses and leakages being related to the degree of magnetic permeability, which itself varies according to the magnetic induction, and to the size of the mean air gap $E_o$ (and thus to the differential expansion of the rotor 120 and stator 111). The correction coefficient a to be applied as a function of the magnetic induction (magnetic flux density) and of the mean air gap value $E_o$ is determined by calibration and makes it possible to remedy sensitivity variations of the various sensor elements used.

As can be seen in FIG. 5, windings 114a to 114d are connected via terminal B to the secondary winding 116d of a transformer 116, the primary winding whereof 116a is supplied with alternating current. A reference winding 115 with a preset fixed air gap is also series-connected with secondary winding 116b, between one end of secondary winding 116b and terminal A, which is itself connected to windings 114a through 114d. A comparison signal representative of the mean air gap $E_o$ of sensor 101 and accordingly of bearing 102 is generated across terminals I and J, i.e. between the middle point 116c of the secondary winding 116b of the transformer 116 and common terminal A of windings 114a to 114d and 115. The current measured by a measuring instrument 117 between terminals I and J is thus representative of the mean air gap value $E_o$.

In the alternative embodiment shown in FIG. 6, the transformer 116 is replaced by a bridge of resistors 119a, 119b directly supplied from an AC carrier current source. In this case the source 118 is connected between terminal B and the end of reference winding 115 not connected to terminal A. terminal I is connected to the common point between resistor 119a and 119b and the other ends of resistors 119a and 119b are connected to the respective terminals of voltage source 118. Information representative of the mean air gap value $E_o$ is originated from the current intensity measured by a measuring apparatus 117 in the same way as for the system of FIG. 5.

The computation circuit 107 (FIG. 7) to which are applied the above-mentioned signals representing the quantities I, $E_o$ and $E_x$, and which also includes memories for recording the different values of coefficient a according to the current intensity I (and thus to the magnetic flux density B) and the size of the mean air gap $E_o$, finds the value of the tensile force F to which the strip 5 is subjected in the area of an individual roll 100, on the basis of the equation (1) given hereinbefore. However, to avoid measurement errors, the control system for bearing 102 must be adjusted, given the stresses produced by the strip of material 5, to prevent the measured current I flowing in the excitation windings of bearing 102 bringing about a saturation of the magnetic field.

To enable measurement of the stresses occurring in the longitudinal direction of the strip 5 at different points along its breadth, the measuring roll 10 is made up of a plurality of juxtaposed individual rolls 100. Each of said individual rolls 100 can be supported by one or two radial bearings 102 equipped with radial position sensors 101. To prevent the different individual rolls 100 marking the strip of material 5 bearing thereon, adjacent individual rolls 100 can be arranged to be in contact end-to-end with a slight axial pressure. Alternatively, narrow rings of a material such as polytetrafluoroethylene (PTFE) can be added to the ends of individual rolls at the juncture between two such rolls 100 to prevent the formation of sharp metal edges on the rolls 100 that might leave marks in the strip 5. Another alternative is to insert separate PTFE rings as spacers between adjacent individual rolls 100. As can be seen from FIG. 2, adjacent individual rolls 100 can also be kept a small distance apart by means of passive axial repulsion bearings consisting of permanent magnets 151, 161 and 152, 162 mounted in the rotors 120 of the individual rolls 100.

The invention can be used to localize longitudinal tensile stresses in strips 5 having an overall width of up to 1500 to 2000 mm. For example, to measure stresses in a strip with a total width of 1800 mm, eighteen individual rolls, each 100 mm long, can be used, with each roll mounted on two active radial magnetic bearings, to provide stress measurements from thirty-six points across the breadth of the strip.

To improve accuracy in spite of irregularities in the initial manufacture of the individual rolls 100, the outside surface of the rotors 120 of said rolls 100 on which said strip bears can be reground following mounting of the rolls on the fixed center shaft 110 to ensure uniform driving of all the rolls 100 by the strip 5 bearing evenly on the full alignment of rolls 100.

Since such rolls 100 mounted on magnetic bearings with an internal stator permit high rotational speeds and therefore high linear spees at the periphery of the rotors 120, the measuring device according to the invention can easily accommodate linear speeds on the order of 50 to 100 m/s.

We claim:

1. Device for measuring the longitudinal tension in a strip of material leaving a rolling mill, comprising a measuring roll over which the strip bearingly runs and load sensors associated with said measuring roll to supply a signal which is a function of the tensile stress in the strip of material bearing on said measuring roll, wherein said measuring roll consists of at least one roll mounted on active radial magnetic bearings which form said load sensors, means for measuring the current in the windings of the active magnetic bearings, means for detecting the radial position of the rolls supported by said bearings and means for measuring the air gap in the magnetic bearings and keeping said air gap substantially constant.

2. Device according to claim 1, wherein said measuring roll consists of a plurality of individual rolls coaxially aligned perpendicularly to the strip of material, each of said individual rolls being mounted on active magnetic bearings and being associated with means for measuring the current in the windings of said active magnetic bearings and with means for measuring the air gap of said magnetic bearings and keeping the latter substantially constant.

3. Device according to claim 2, wherein adjacent individual rolls are in end-to-end contact with a slight axial pressure.

4. Device according to claim 3, wherein a polytetrafluoroethylene spacer is inserted between adjacent individual rolls.

5. Device according to claim 2, wherein said plurality of individual rolls aligned to form the measuring roll are reground over their outside surface after mounting so as to enable uniform driving of the full alignment of rolls by the strip of material.

6. Device according to claim 2, wherein said measuring roll consists of between fifteen and twenty individual rolls each supported in alignment by two radial magnetic bearings, each of said individual rolls being of a length on the order of 100 mm.

7. Device according to claim 1, wherein each individual roll is supported by two active magnetic bearings.

8. Device according to claim 1, wherein each active radial bearing is associated with a first series of electromagnetic detectors of the radial position of the corresponding individual roll to control said active radial bearing and keep said radial position substantially constant and with a second series of electromagnetic radial position detectors, the latter being associated with at least one reference winding having a preset air gap, to determine the value of the mean air gap $E_o$ of said magnetic bearing.

9. Device according to claim 8, wherein a correction is effected for different values of the mean air gap $E_o$, said values corresponding to different operating temperatures, said corrections being based upon a prior calibration consisting in determining the correction coefficient a which must be applied to the mean air gap for each of several different loads so as to determine the value of the load F according to the equation $$F = K(I^2/(E_o + E_x + a)^2)$$

where I is the intensity of the current applied to the magnetic bearing, $E_o$ the measured value of the mean air gap, $E_x$ the value of the differential air gap measured by the first series of detectors and held to a substantially null value, a the correction coefficient taking into account magnetic leakages and changes in the permeability $\mu$ of the radial bearing stator according to the magnetic induction and the expansion of the rotor, and K a meter constant.

10. Device according to claim 1, wherein adjacent individual rolls are kept a small axial distance apart by means of repulsion-type passive axial bearings consisting of permanent magnets mounted in the ends of said individual rolls, with same polarities on facing ends of said adjacent rolls.

* * * * *

UNITED STATES PATENT AND TRADEMARK OFFICE
CERTIFICATE OF CORRECTION

PATENT NO. : 4,561,313
DATED : December 31, 1985
INVENTOR(S) : HELMUT HABERMANN, ET AL.

It is certified that error appears in the above-identified patent and that said Letters Patent are hereby corrected as shown below:

Column 6, line 7, change "spees" to --speeds--.

Signed and Sealed this

Fourth Day of March 1986

[SEAL]

Attest:

DONALD J. QUIGG

Attesting Officer  Commissioner of Patents and Trademarks